United States Patent [19]

Heftmann

[11] 4,007,862
[45] Feb. 15, 1977

[54] CAR RACK FOR HOLDING SURFBOARDS OR THE LIKE

[75] Inventor: Rex Walter Heftmann, Pacific Beach, Calif.

[73] Assignee: Rax Works, Inc., Encinitas, Calif.

[22] Filed: Mar. 13, 1975

[21] Appl. No.: 557,940

[52] U.S. Cl. .................. 224/42.1 B; 280/DIG. 7
[51] Int. Cl.² ............................... B60R 11/00
[58] Field of Search ............... 224/42.1 R, 42.1 B, 224/42.1 F, 29 R, 42.1 E; 280/DIG. 7; 248/20, 358 R, 359

[56] References Cited

UNITED STATES PATENTS

| 1,991,633 | 2/1935 | Serpico | 224/42.1 B |
| 2,409,946 | 10/1946 | MacLeod | 224/42.1 E |
| 3,884,404 | 5/1975 | Frost | 224/42.1 B |

FOREIGN PATENTS OR APPLICATIONS

| 766,722 | 4/1934 | France | 224/42.1 B |
| 1,430,612 | 5/1969 | Germany | 224/42.1 B |

*Primary Examiner*—Robert J. Spar
*Assistant Examiner*—Jerold M. Forsberg
*Attorney, Agent, or Firm*—Christie, Parker & Hale

[57] ABSTRACT

A detachable car rack is adapted to support a surfboard or similar elongated object atop a car mounting surface such as its roof. To preclude marring or similar finish damage, a pair of elongated, compressible support pads are disposed at a spaced distance from each other between the mounting surface and the surfboard. With each support pad there are provided a frame member, and first and second lengths of strap extending from opposite ends of the support pad to slidably pass through the frame member and form a loop that is adjustable to tightly gird the surfboard. Each length of strap folds back to extend away from the frame member to a remote end where there is attached an anchor such as a hook for gripping an edge of the mounting surface such as is commonly provided by a gutter extending along the respective side of the car roof.

10 Claims, 3 Drawing Figures

CAR RACK FOR HOLDING SURFBOARDS OR THE LIKE

BACKGROUND OF THE INVENTION

This invention relates to car racks.

Over the years there have been developed many different kinds of detachable car racks. For example, U.S. Pat. No. 2,735,095 shows a foldable luggage-carrier that provides anchor points to which securing ropes can be tied. Another device that is primarily adapted for supporting luggage or similar rectangular objects is shown in U.S. Pat. No. 3,145,889. Both of the foregoing devices have disadvantages. As to the foldable device, the principal disadvantage resides in the need when loading and unloading the luggage to tie and untie the securing ropes. This is time consuming and laborious particularly because one has to reach from the side of the car over to the top to do this work. As to the device shown in U.S. Pat. No. 3,145,889, it suffers the disadvantages of being rather complex and thus is expensive to manufacture, and it does not fold up or otherwise collapse for ease of storage when not in use.

Other devices have been developed whose structure is such that their use for all practical purposes is limited to supporting skis atop a car. Representative devices of this type are shown in U.S. Pat. Nos. 3,225,987 and 2,071,222.

SUMMARY OF THE INVENTION

This invention provides a car rack that is easily installed and removed from a car, and when removed is compact and easily stored. Moreover, owing to its relatively simple construction, it is inexpensive to manufacture. A detachable car rack according to the invention is adapted to support an elongated object such as a surfboard, or a stack of such objects, atop a surface of a car without marring or otherwise damaging the finish of either the car surface or the object. Typically, the car mounting surface to which the rack is attached is the car roof; however, the car rack can also easily be attached to the trunk.

To install the car rack atop the roof of a car, at least a pair of identical accessories are mounted on top of the car roof in spaced relationship with each other. Each accessory includes an elongated support pad to be disposed between the object and the roof. The support pad is compressible, preferably being made of neoprene, although other spongy substances such as urethane are suitable. A frame member such as a relatively inexpensive two-bar loop is provided. Strap means span the car roof and include first and second lengths of strap that extend from opposite ends of the support pad to slidably pass through the frame member so as to cooperate with the support pad to form a loop that is adjustable to tightly gird the object. Each length of strap folds back to extend away from the frame member to a remote end of the strap means where there is attached an anchor such as a hook. The hooks provide for gripping opposite edges of the car mounting surface such as the gutters often provided along the opposite sides of the roof. With the strap means draped loosely across the roof, the loops are easily enlarged to permit entry or removal of an elongated object such as a surfboard. With the strap means being pulled taut, the loops adjust in size to tightly gird the object. Thus, at the same time that one pulls a remote end while securing the grip attached thereto, the loops are appropriately tightened.

In a presently preferred embodiment the support pad has a tunnel extending through it and the strap means comprises a continuous strap having a portion disposed therein that joins the first and second lengths of strap. Alternatively, the first and second lengths of strap are separately anchored to the support pad. A very important preferred feature resides in the provision of means for adjusting the overall length of the strap means to adapt it to span the particular width of a particular car surface.

DETAILED DESCRIPTION

Figure 1:
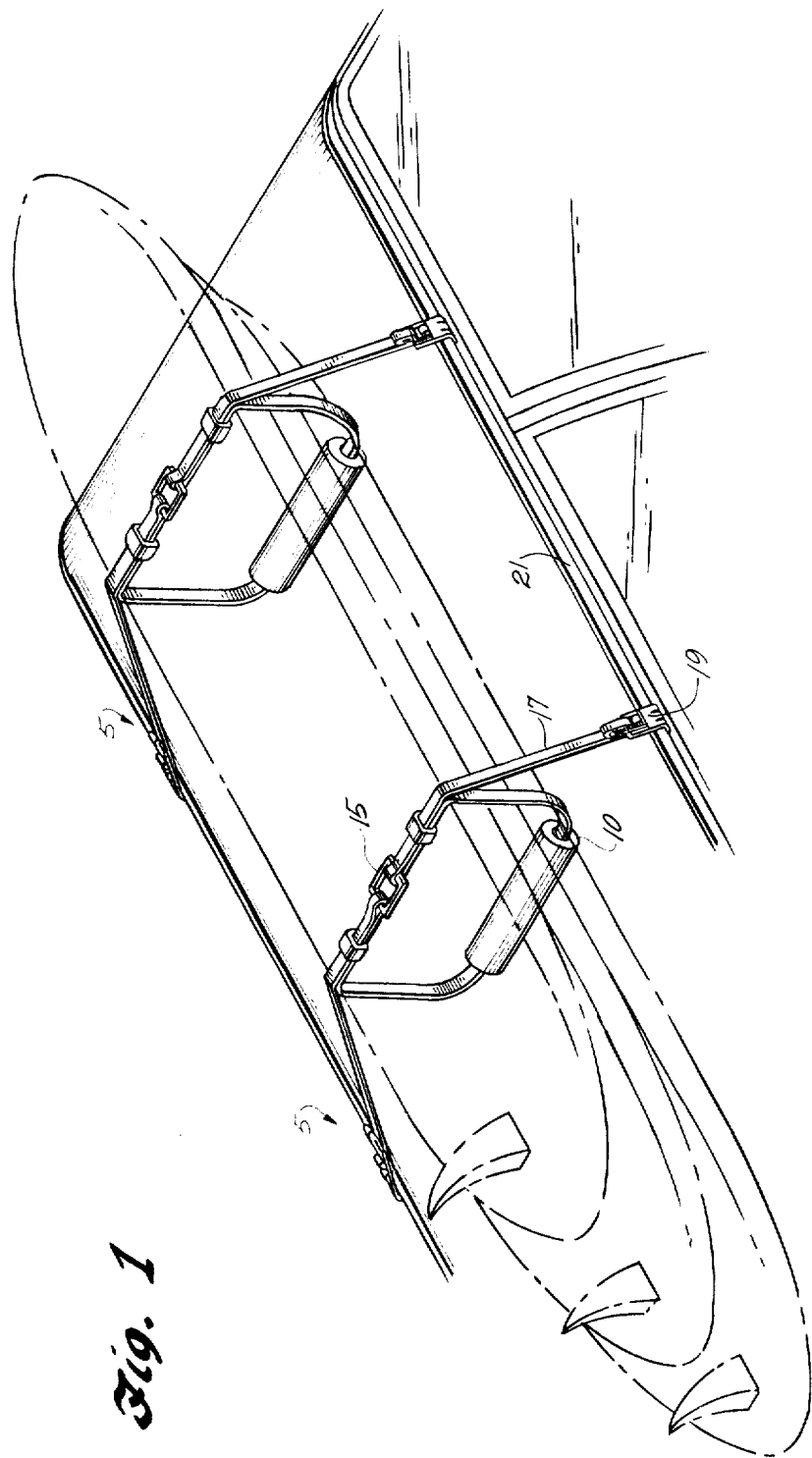
FIG. 1 is a perspective view of a car rack embodying the invention as installed on the roof of a car to support a stack of surfboards.
Figure 2:
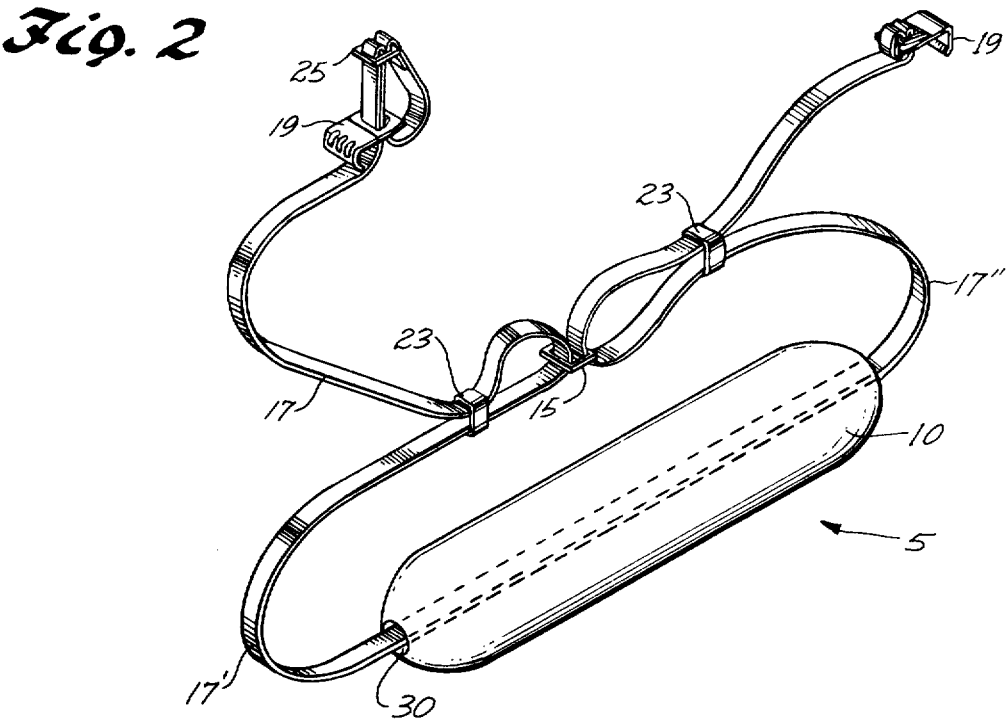
FIG. 2 is a perspective view of one of two identical accessories used in the car rack of FIG. 1.

With reference to FIGS. 1 and 2, a detachable car rack embodying the invention includes a pair of identical accessories generally indicated at 5. Each accessory includes an elongated support pad 10 that as shown in FIG. 1 is disposed between a surfboard and the car roof. The support pad is compressible, preferably being made of neoprene, although other spongy substances such as urethane are suitable.

In one specific embodiment, the support pad is about fourteen inches long and is cylindrical in shape, having an outer diameter of about two inches.

With each accessory there is provided a frame member 15. In the specifically described embodiment, the frame member is the type of metal device sometimes referred to as a "two-bar loop."

Each accessory according to this invention includes strap means for spanning the car mounting surface. In the preferred embodiment of FIGS. 1 and 2 the strap means comprises a continuous fabric strap 17 made from polypropylene, and is about one inch wide. The strap 17 has first and second strap lengths 17' and 17" that extend first of all from opposite ends of the support pad 10 along U-shaped paths to slidably pass through the frame member 15 so as to cooperate with the support pad to form a loop that is adjustable to tightly gird the loaded object or stacked objects such as the surfboards of FIG. 1. The strap lengths 17' to 17" fold back to extend away from the frame member to their opposite remote ends where there is attached an anchor such as hook 19 for gripping the gutter 21 provided along a respective side of the car roof. In summary, each strap length extends along an S-shaped path between one end of the support pad and the attached hook 19. Preferably, a pair of sleeves 23 are provided that tend to eliminate twisting of the strap lengths. As is discussed below, the sleeves also play a helpful role when the rack is being installed. Each sleeve preferably comprises a short length of fabric, for example about three inches, that has been wrapped around overlying portions of the strap 17 and then is sewn to form the sleeve.

A very important preferred feature of the invention resides in the provision of means for adjusting the overall length of the strap means. Such adjustment is necessary to accommodate variations in width for different cars. Moreover, even as to a particular car, this adjustability feature is advantageous in view of its cooperation with adjustments in the size of the load girding loop incident to the supporting of different loads. As to this adjustability feature, consider with reference to FIG. 2 the path along which the outer portion of strap length 17' extends between the frame member 15 and an end piece frame 25 that in the preferred embodiment is a three-bar loop. It extends first of all upwardly through a rectangular opening in the flat portion of the hook 19. Then it folds back around the central bar of the three-bar loop 25 to descend back through the rectangular opening. Finally, it folds back upwardly again to extend up to where it is folded around the inner bar of the three-bar loop 25 and secured as by a rivet, snap fastener or the like. This arrangement makes it easy to adjust the effective length of the strap 17' (i.e., from one end of the support pad to the grip). It bears mention that it is easiest to adjust the length by pulling the strap in a direction perpendicular to the flat portion of the hook 19. Moreover, once adjusted as desired, it remains so even under substantial tension because then the three-bar loop 25 bears against the grip 19 and two portions of the strap inside the rectangular openings are cinched together. This condition is illustrated with respect to the strap length 17''.

Figure 3:
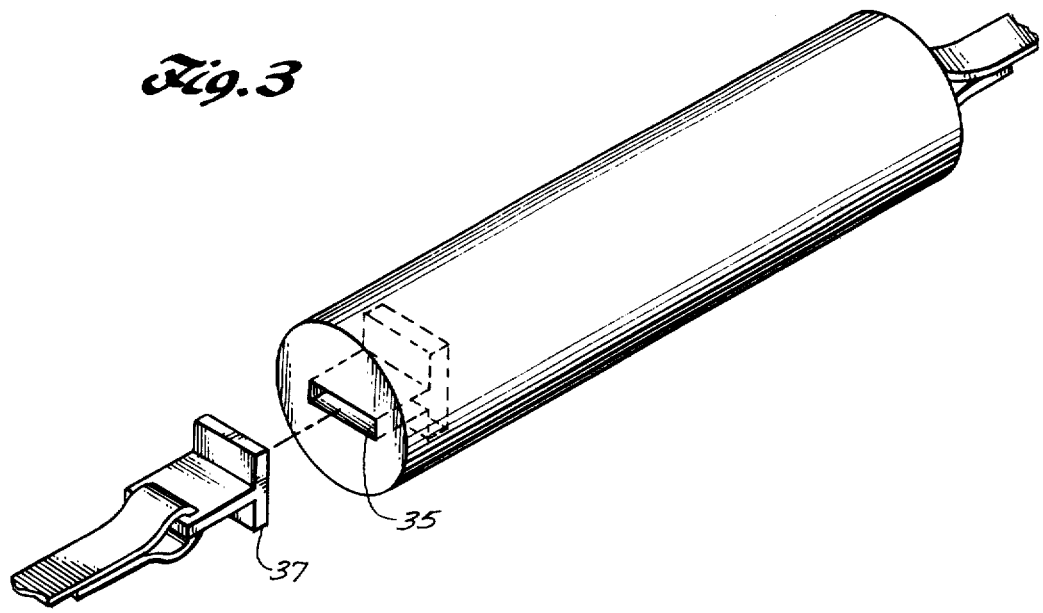
FIG. 3 is a perspective view illustrating a feature of an alternative embodiment of the invention.

With reference again to the support pad 10, a tunnel 30 (FIG. 2) is provided therethrough that serves as a passageway for the portion of the continuous strap 17 that joins the strap lengths 17' and 17''. In an alternative embodiment as illustrated in FIG. 3, the strap lengths 17' and 17'' are distinct straps and each is separately anchored to the support pad. In this embodiment, there is provided at each end of the support pad a generally T-shaped cavity 35 that serves as a receptacle for receiving and holding a correspondingly shaped insert 37 to which the strap is snap fastened. Inasmuch as the support pad is compressible, the insert 35 can be forced into the cavity and be twisted to remain locked therein.

It will be appreciated from the foregoing that this invention is simple in construction and admits of low-cost manufacture. A key advantage it has resides in its ease of use. Thus, with the strap means draped loosely across the car roof, the load girding loop is easily enlarged to permit entry or removal of an elongated object such as a surfboard. With the strap means being pulled taut, the load-girding loop adjusts in size to tightly gird the object. Thus, at the same time one pulls a remote end to bring the grip attached thereto into connection with the gutter, the load girding loop is appropriately tightened.

As to the preferred embodiment, the most appropriate steps to take in installing the car rack are as follows. Prior to placing the accessories on the car, enlarge the load girding loops and then place the surfboard or the like through the loops. Then slide the sleeves up against the frame members of each accessory, thus somewhat cinching the straps at these points. Next, place the arrangement atop the car mounting surface (the cinching action caused by the sleeves keeps the loops in place while this is done). Then, dispose the hooks adjacent the mounting surface opposite edges. Finally, adjust the effective length of the strap lengths so that the strap means tautly spans the mounting surface, this at the same time tightening the load girding loop.

What is claimed is:

1. An accessory detachably securable on a mounting surface of a car in spaced relationship with an identical accessory to form a rack for supporting an elongated object such as a surfboard, the accessory comprising:
   an elongated support pad to be disposed between the object and the mounting surface, the support pad being compressible so as to preclude marring the finish on the mounting surface or object;
   a frame member;
   strap means for tautly spanning the mounting surface and including first and second lengths of strap extending from opposite ends of the support pad to slidably pass through the frame member and fold back to extend away therefrom to opposite remote ends of the strap means, said first and second lengths cooperating with the support pad and with the frame member to form a loop that is adjustable to tightly gird the object and secure the object in a fixed position between the mounting surface and the frame member when the strap means tautly spans the mounting surface; and
   separate anchor means attached to each remote end for connection to a fixed point at an edge of the mounting surface so as to maintain the tightness of the loop.

2. An accessory according to claim 1 wherein the strap means includes means for adjusting the length between its remote ends.

3. An accessory according to claim 2 wherein the support pad has first and second receptacles at its opposite ends and the first and second lengths of strap have inserts for connection to the receptacles.

4. An accessory according to claim 1 wherein the support pad is made of neoprene.

5. An accessory according to claim 1 wherein the first and second lengths of strap are fabric.

6. An accessory according to claim 1 wherein the strap means includes means for adjusting the length between its remote ends, and a pair of sleeves wrapped around the strap means on opposite sides of the frame member and slidable up to the frame member so as to cinch the folded-back portions of the strap lengths.

7. An accessory detachably securable on a mounting surface of a car in spaced relationship with an identical accessory to form a rack for supporting an elongated object such as a surfboard, the accessory comprising:
   an elongated support pad to be disposed between the object and the mounting surface, the support pad having a tunnel therethrough and being compressible so as to preclude marring the finish on the mounting surface or object;
   a frame member;
   strap means for tautly spanning the mounting surface and including a continuous strap having first, second, and third lengths of strap, the third length of strap extending through the tunnel to join the first and second lengths of strap, the first and second lengths of strap extending from opposite ends of the support pad to slidably pass through the frame member and fold back to extend away therefrom to opposite remote ends of the strap means, said first and second lengths cooperating with the support pad and with the frame to form a loop that is adjustable to tightly gird the object and secure the object in a fixed position between the mounting surface and the frame member when the strap means tautly spans the mounting surface; and separate anchor means attached to each remote end for connection to a fixed point at an edge of the mounting surface so as to maintain the tightness of the loop.

8. An accessory according to claim 7 wherein the strap means includes means for adjusting the length between its remote ends.

9. An accessory according to claim 7 wherein at least one of the anchor means comprises a hook having an opening and an end piece frame having first and second bars, a portion of the strap means extending upwardly through the opening, around the first bar, back downwardly through the opening, and back upwardly for attachment to the second bar of the end piece frame.

10. An accessory detachably securable on a mounting surface of a car in spaced relationship with an identical accessory to form a rack for supporting an elongated object such as a surfboard, the accessory comprising:

an elongated support pad to be disposed between the object and the mounting surface, the support pad being compressible so as to preclude marring the finish on the mounting surface or object;

a frame member;

strap means for tautly spanning the mounting surface and including first and second lengths of strap extending from opposite ends of the support pad to slidably pass through the frame member and fold back to extend away therefrom to opposite remote ends of the strap means, said first and second lengths cooperating with the support pad and with the frame member to form a loop that is adjustable to tightly gird the object and secure the object in a fixed position between the mounting surface and the frame member when the strap means tautly spans the mounting surface;

separate anchor means attached to each remote end for connection to a fixed point at an edge of the mounting surface so as to maintain the tightness of the loop; and at least one of the anchor means cooperating with the strap means to provide for adjusting the length of strap between the separate anchor means, and comprising a hook having an opening, and an end piece frame having first and second bars, with a portion of the strap means extending upwardly through the opening, around the first bar, back downwardly through the opening, and back upwardly for attachment to the second bar of the end piece frame.

* * * * *